United States Patent
Miyata et al.

(10) Patent No.: US 8,586,372 B2
(45) Date of Patent: Nov. 19, 2013

(54) MOLECULE-RESPONSIVE GEL PARTICLES, METHOD OF PRODUCTION OF THE SAME, AND USE THEREOF

(75) Inventors: Takashi Miyata, Suita (JP); Tadashi Uragami, Suita (JP)

(73) Assignees: A School Corporation Kansai University, Osaka (JP); Japan Science and Technology Agency, Saitama (JP)

( * ) Notice: Subject to any disclaimer, the term of this patent is extended or adjusted under 35 U.S.C. 154(b) by 835 days.

(21) Appl. No.: 12/598,904

(22) PCT Filed: Apr. 25, 2008

(86) PCT No.: PCT/JP2008/058117
§ 371 (c)(1),
(2), (4) Date: Nov. 4, 2009

(87) PCT Pub. No.: WO2008/139902
PCT Pub. Date: Nov. 20, 2008

(65) Prior Publication Data
US 2010/0136706 A1  Jun. 3, 2010

(30) Foreign Application Priority Data
May 7, 2007 (JP) ................. 2007-122459

(51) Int. Cl.
*G01N 37/00* (2006.01)
*C12Q 1/68* (2006.01)

(52) U.S. Cl.
USPC .......... 436/148; 435/6.1; 536/25.4; 536/24.3; 436/94; 525/54.2

(58) Field of Classification Search
USPC .......... 436/94, 148; 525/54.2; 536/24.3, 25.4; 524/27
See application file for complete search history.

(56) References Cited

U.S. PATENT DOCUMENTS

| | | |
|---|---|---|
| 5,739,946 A | 4/1998 | Iwanaga et al. |
| 6,110,684 A | 8/2000 | Kemper et al. |
| 6,616,946 B1 | 9/2003 | Meier et al. |
| 2002/0164589 A1 | 11/2002 | Taylor |
| 2004/0146500 A1 | 7/2004 | Miyata et al. |
| 2005/0209411 A1 | 9/2005 | Nestler et al. |
| 2007/0156042 A1 | 7/2007 | Unal |

FOREIGN PATENT DOCUMENTS

| | | |
|---|---|---|
| CN | 1653094 | 8/2005 |
| EP | 1852454 | 11/2007 |
| EP | 1 892 519 | 2/2008 |
| EP | 1892519 | 2/2008 |

(Continued)

OTHER PUBLICATIONS

Umeno, Daisuke. Affinitey adsorption separation of metagenic molecules by polyacrylamide hydrogels comprising double stranded DNA.(1998). Analytica Chimica Acta. 365: 1-3, p. 101-108.*

(Continued)

*Primary Examiner* — Yelena G Gakh
*Assistant Examiner* — Rebecca M Fritchman
(74) *Attorney, Agent, or Firm* — Kagan Binder, PLLC

(57) ABSTRACT

The invention provides molecule-responsive gel particles which change in size in response to specific molecules and a method of production of the same. A polymer gel particle with a crosslinked structure has fixed thereto a plurality of clathrate compound-forming host molecules. Two or more of the plurality of host molecules clathrate different atomic groups in a target molecule so that the two or more host molecules and the target molecule can form a crosslink in the molecule-responsive gel particle.

19 Claims, 3 Drawing Sheets

(56) References Cited

FOREIGN PATENT DOCUMENTS

| | | |
|---|---|---|
| JP | 09-302263 | 11/1997 |
| JP | 2002-239358 | 8/2002 |
| JP | 2003-514650 | 4/2003 |
| JP | 2005-106533 A | 4/2005 |
| JP | 2006-137805 | 6/2006 |
| JP | 2006-138656 A | 6/2006 |
| JP | 2006-161027 | 6/2006 |
| JP | 2006-257139 | 9/2006 |
| JP | 2007-046041 | 2/2007 |
| WO | 2006/118077 | 11/2006 |

OTHER PUBLICATIONS

U.S. Appl. No. 12/448,857, filed Jul. 10, 2009, Miyata et al.

Miyata, et al., "A reversibly antigen-responsive hydrogel," Nature, vol. 399, pp. 766-769 (1999).

Miyata, et al., "Tumor marker-responsive behavior of gels prepared by biomolecular imprinting," Proc. Natl. Acad. Sci., vol. 103, pp. 1190-1193 (2006).

Hayashi, et al., "pH-Sensitive Nanogel Possessing Reactive PEG Tethered Chains on the Surface," Macromolecules, 37, pp. 5389-5396 (2004).

Nayak et al. "Soft Nanotechnology with Soft Nanoparticles," Angew. Chem. Int. Ed., 44, pp. 7686-7708 (2005).

International Search Report mailed Aug. 5, 2008 (2 pgs).

T. Miyata et al., "Controlled Structures and Responsiveness of Stimuli-responsive Gels That Undergo Volume Changes in Response to Biomolecules," Polymer Preprints, Japan vol. 55 No. 2, pp. 4516-4517,1S14 The Society of Polymer Science, Japan (2006).

T. Miyata et al., "Structure Control and Response Behavior of Smart Gel Which Responds to Biomolecule," Papers at 11$^{th}$ Kansai University Symposium on Innovative Science and Technology, pp. 157-158, The Organization for Research and Development of Innovative Science and Technology, Kansai University (Jan. 10, 2007).

T. Miyata et al., "Synthesis of Two DNA-responsive Gels That Swell or Shrink in Response to DNA Sequences," Abstract of Lectures at 18$^{th}$ Research Workshop on Polymer Gels, pp. 27-28, The Society of Polymer Science, Japan (Jan. 9, 2007).

K. Ohkawa et al., "Synthesis of DNA-responsive Gels Using Duplex DNAs as Crosslinking Points," Abstract of Lectures at 17$^{th}$ Research Workshop on Polymer Gels, pp. 39-40, The Society of Polymer Science, Japan (Jan. 18, 2006).

T. Miyata et al., "Synthesis of DNA-responsive Gels Having DNA Duplexes as Crosslinking Points and Their DNA-Recognition Behavior," Polymer Preprints, Japan vol. 55 No. 1, p. 1957, The Society of Polymer Science, Japan (2006).

T. Miyata et al., "Synthesis of DNA-responsive Gels of Different Swelling and Shrinking Types and Their Response Behavior," Polymer Preprints, Japan vol. 55 No. 2, pp. 5349-5350, Society of Polymer Science, Japan (2006).

Y. Murakami et al., "Hybrid Hydrogels to Which Single-Stranded (ss) DNA Probe is Incorporated Can Recognize Specific ssDNA," Macromolecules, vol. 38 No. 5, pp. 1535-1537 (2005).

Y. Murakami et al., "DNA-Responsive Hydrogels That Can Shrink or Swell," Biomacromolecules, vol. 6 No. 6, pp. 2927-2929 (2005).

D. Umeno et al., "Affinity adsorption separation of mutagenic molecules by polyacrylamide hydrogels comprising double-stranded DNA," Anal. Chim. Acta., vol. 365, pp. 101-108 (1998).

U.S. Appl. No. 12/448,857, Entry into U.S. National Phase Jul. 10, 2009, International Application No. PCT/JP2007/065384, International Filing Date Aug. 6, 2007.

Chinese Office Action, mailed Dec. 31, 2010, with English-language translation, in Chinese Application No. 200880014924, 11 pages.

Office Action from U.S. Appl. No. 12/448,857, mailed Dec. 29, 2011.

"Nucleotide & Nucleic Acid Properties", pp. 1 and 2. Printed on Dec. 23, 2011.

1988 Stratagene catalog (p. 39). Published by Stratagene, 11011 North Torrey Pines Road, La Jolla, CA 92037, USA.

Final Office Action in U.S. Appl. No. 12/448,857; mailed Jun. 29, 2012; 22 pgs.

Advisory Action in U.S. Appl. No. 12/448,857, dated Oct. 3, 2012, 7 pgs.

Miyata et al., "Biomolecule-Responsive Behavior of Smart Gels Having Biomolecular Complexes as Reversible Cross-Links,"2006 AIChE Annual Meeting, Dec. 14, 2006.

Translation of Japanese Office Action (Notification of Reasons for Refusal mailed Dec. 18, 2012), JP Patent Application No. 2007-005227.

Non-Final Office Action, U.S. Appl. No. 12/448,857, mailed Feb. 25, 2013.

\* cited by examiner

FIG. 2

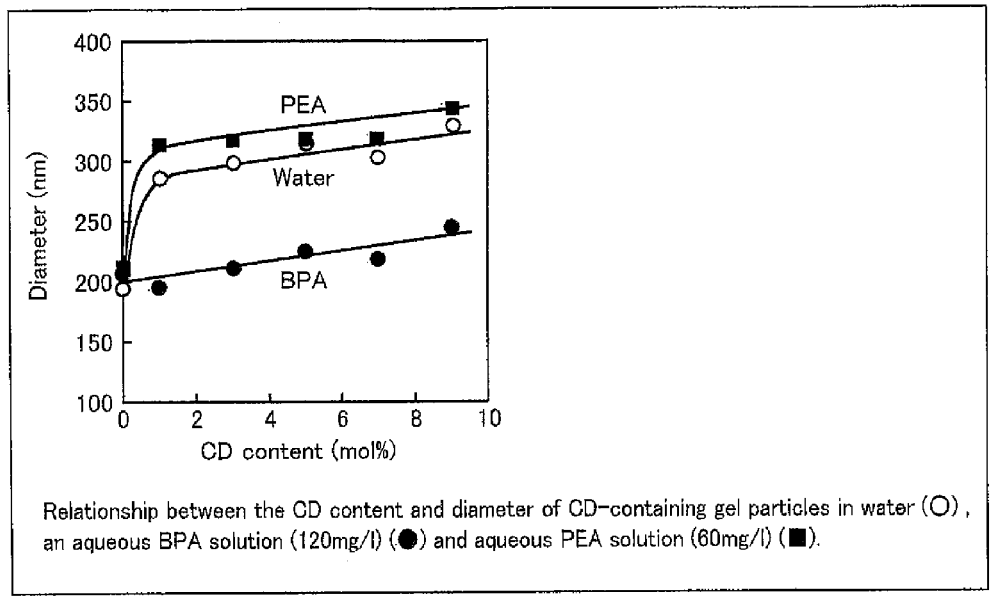

Relationship between the CD content and diameter of CD-containing gel particles in water (○), an aqueous BPA solution (120mg/l) (●) and aqueous PEA solution (60mg/l) (■).

FIG. 3

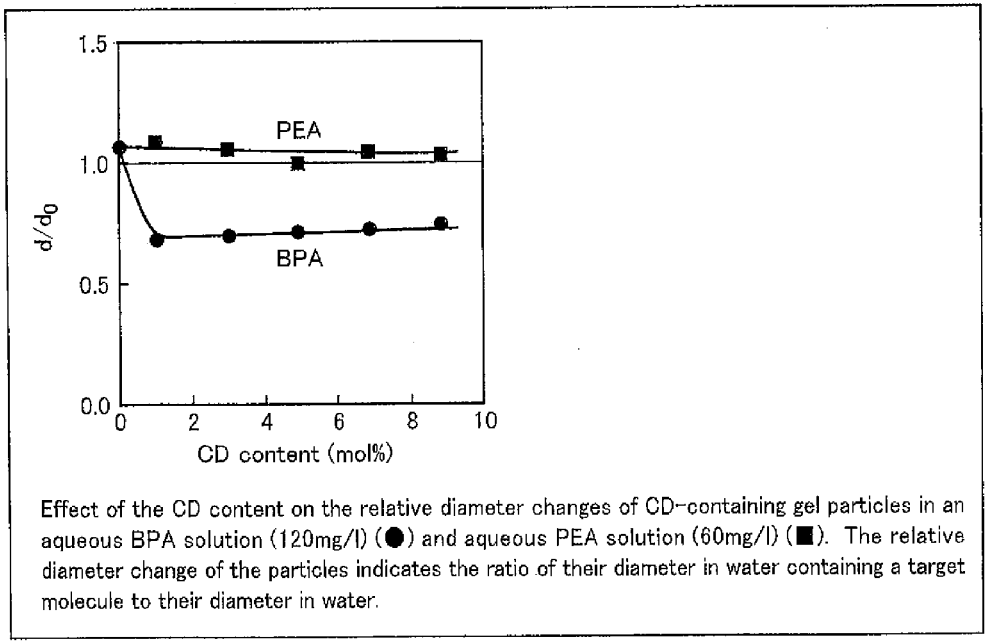

Effect of the CD content on the relative diameter changes of CD-containing gel particles in an aqueous BPA solution (120mg/l) (●) and aqueous PEA solution (60mg/l) (■). The relative diameter change of the particles indicates the ratio of their diameter in water containing a target molecule to their diameter in water.

MOLECULE-RESPONSIVE GEL PARTICLES, METHOD OF PRODUCTION OF THE SAME, AND USE THEREOF

TECHNICAL FIELD

The present invention relates to molecule-responsive gel particles, a method of production of the same, and use thereof, and in particular, to molecule-responsive gel particles which change in volume in response to a target molecule, a method of production of the same, and use thereof.

BACKGROUND ART

Stimuli-responsive gels which change in structure in response to an external change in environment, such as pH or temperature, are attracting attention as next-generation soft materials which on its own provides a sensor function, a processor function, and an effector function. Attempt has been made especially in the environment and medical fields to synthesize a stimuli-responsive gel which swells or shrinks upon recognizing specific molecules (molecule recognition capability).

For example, the inventors of the present invention have so far suggested stimuli-responsive gels which respond to disease-causing signaling biomolecules and endocrine disrupting chemicals. In these molecule-responsive gels, the reversible crosslinking sites of the gel formed by bonding with target molecules are exploited. See, for example, non-patent literatures 1 and 2.

Particles, especially, nanosize particles, have been vigorously investigated as new materials for sensor, separation, and adsorption, for example. The stimuli-responsive gel particle which changes in structure in response to an external change in environment is particularly promising, owing to the large surface area in comparison to the volume, for future applications in environmental conservation, for example, as a material which adsorbs/removes environmental contaminates, and in medicine, for example, as a device for use in drug delivery systems. Many species of pH-responsive gel particles and temperature-responsive gel particles of that nature have been reported. See, for example, patent literature 1 and non-patent literatures 3 and 4.

Non-patent literature 3 mentioned above reports a method for synthesizing pH-responsive gel particles by emulsion polymerization involving no use of emulsifier from 2-(N,N-diethylamino) ethyl methacrylate (DEAEMA) as a primary monomer in the presence of a dispersion stabilizer and a crosslinking agent.

Meanwhile, non-patent literature 4 is an up-to-date summary introducing various past and current researches on stimuli-responsive gel particles which change in size in response to pH, temperature, and other stimuli.

Patent literature 1 discloses a hollow particle which changes in transmittance in response to changes in at least one environment condition, such as pH, temperature, or light.

CITATION LIST

Patent Literature 1

Published Japanese Translation of PCT Application, Tokuhyo, No. 2003-514650 (Publication Date: Apr. 22, 2003)

Non-Patent Literature 1

T. Miyata, N. Asami, T. Uragami, Nature, 399, 766-769 (1999)

Non-Patent Literature 2

T. Miyata, M. Jige, T. Nakaminami, T. Uragami, Proc. Natl. Acad. Sci. USA, 103, 1190-1193 (2006)

Non-Patent Literature 3

H. Hayashi, M. Iijima, K. Kataoka, Y. Nagasaki, Macromolecules, 37, 5389-5396 (2004)

Non-Patent Literature 4

S. Nayak, L. A. Lyon, Angew. Chem. Int. Ed, 44, 7686-7708 (2005)

SUMMARY OF INVENTION

Technical Problem

As mentioned earlier, stimuli-responsive gels in bulk form which change in volume in response to a specific molecule are known. It is however expected to synthesize such a stimuli-responsive gel in particle form, not in conventional bulk form, for applications in the environmental and medical fields.

Almost every stimuli-responsive gel particle reported so far responds to pH or temperature. Very few reports have been made about molecule-responsive gel particles which recognize specific molecules and change in size because they are difficult to synthesize.

The polymer gel particle is typically produced by "emulsion polymerization" of a monomer using a low-molecular-weight surfactant as an emulsion stabilizer. The surfactant used in the production of the molecule-responsive gel particle, however, can have adverse effect on its response to molecules. Synthesis involving no use of emulsifier is desirable.

The emulsifier-free emulsion polymerization still requires use of a hydrophilic monomer acting as a dispersion stabilizer as in non-patent literature 3 because the gel particle has a large surface area, which could have adverse effect on the response to molecules.

Furthermore, the molecule-responsive gel particle needs to exhibit a sufficiently large, thus detectable, change in size in response to a target molecule.

The present invention, conceived in view of these problems, has an objective of providing a molecule-responsive gel particle which changes in size in response to a specific molecule and a method of production of such a particle.

Solution to Problem

The molecule-responsive gel particle in accordance with the present invention is, to address the problems, characterized in that it is a molecule-responsive gel particle changing in volume in response to a target molecule and includes: a polymer gel particle having a crosslinked structure; and a plurality of clathrate compound-forming host molecules fixed to the polymer gel particle.

According to the arrangement, two or more of the plurality of host molecules clathrate different atomic groups in the target molecule so that the two or more host molecules and the target molecule form a new crosslink in the molecule-responsive gel particle, which changes the volume of the molecule-responsive gel particle.

The molecule-responsive gel particle in accordance with the present invention is adapted so that two or more of the plurality of host molecules clathrate different atomic groups in the target molecule so that the two or more host molecules and the target molecule form a crosslink in the molecule-responsive gel particle.

According to the arrangement, the volume of the molecule-responsive gel particle changes in response to target molecules each containing two or more atomic groups which can be clathrated by the plurality of host molecules.

The molecule-responsive gel particle in accordance with the present invention may be defined as a molecule-responsive gel particle which changes in volume in the presence of target molecules each containing two or more atomic groups which can be clathrated by the plurality of host molecules.

The molecule-responsive gel particle in accordance with the present invention may be such that the molecule-responsive gel particle changes in volume in the presence of target molecules each containing two or more types of atomic groups which can be clathrated by the plurality of host molecules which is a combination of two or more different types of host molecules.

The molecule-responsive gel particle in accordance with the present invention is preferably a hydrogel. According to the arrangement, the particle swells in water or a like hydrophilic medium, bonds with a target molecule, and shrinks, which changes the size of the particle.

The plurality of host molecules is preferably at least one or more types of molecules selected from the group consisting of cyclodextrin, crown compounds, cyclophane, azacyclophane, calixarene, and derivatives thereof.

According to the arrangement, the volume of the molecule-responsive gel particle changes in response to target molecules each containing two or more atomic groups which can be clathrated by the plurality of host molecules.

The polymer gel particle is preferably obtained by emulsion polymerization of a monomer having a single polymerizable C=C double bond and a hydrophilic crosslinking monomer. The monomer having a single polymerizable C=C double bond is more preferably a hydrophobic monomer.

According to the arrangement, molecule-responsive gel particles which recognize specific molecules and change in size are produced in a suitable manner.

In addition, letting a net amount of the monomer having a single polymerizable C=C double bond and the hydrophilic crosslinking monomer be 100 mol %, the crosslinking monomer is preferably used within a range of 0.1 to 50 mol %.

According to the arrangement, molecule-responsive gel particles which recognize specific molecules and change in size are produced in a suitable manner. In other words, polymer gel particles which exhibit good dispersion stability and which do not form precipitates or aggregates in synthesis are produced.

The hydrophobic monomer is preferably a (meth)acrylate monomer, a vinyl ether monomer, vinyl acetate, or styrene. In addition, the (meth)acrylate monomer is preferably 2-(N,N-dialkylamino)alkyl(meth)acrylate or 2-hydroxyethyl(meth)acrylate.

According to the arrangement, molecule-responsive gel particles which recognize specific molecules and change in size are produced in a suitable manner.

The crosslinking monomer is more preferably a compound with two or more polymerizable C=C double bonds and an alkylene glycol chain of general formula (1)

where R is an alkylene group of a carbon number 1 to 6 and may or may not vary from one RO repeat unit to another, and n is an integer from 2 to 20. The crosslinking monomer is even more preferably polyalkylene glycol di(meth)acrylate, polyalkylene glycol tri(meth)acrylate, polyalkylene glycol divinyl ether, or polyalkylene glycol trivinyl ether.

According to the arrangement, molecule-responsive gel particles which recognize specific molecules and change in size are produced in a suitable manner. In addition, the monomer has also a function as a dispersion stabilizer. That eliminates the need to separately use a dispersion stabilizer or a hydrophilic monomer acting as a dispersion stabilizer.

The plurality of host molecules is preferably used in 0.1 to 40 mol % with respect to a net amount of the plurality of host molecules and all the feedstock monomers.

According to the arrangement, molecule-responsive gel particles which recognize specific molecules and change in size are produced in a suitable manner. In other words, polymer gel particles which exhibit good dispersion stability and which do not form precipitates or aggregates in synthesis are produced.

The molecule-responsive gel particle in accordance with the present invention preferably has an average diameter of 10 nm to 50 μm. According to the arrangement, the molecule-responsive gel particle is preferably used for sensors and potentially in the environmental, medical, and other various fields because smaller particles show a higher response rate.

In addition, the present invention encompasses a dry product obtained by drying the molecule-responsive gel particles. The dry product, re-dispersed in a liquid, can be used as molecule-responsive gel particles.

The method of producing molecule-responsive gel particles in accordance with the present invention is, to address the problems, characterized in that it includes: the reactive-functional-group-introducing step of introducing reactive functional groups to at least one type of host molecules; and the polymerization step of emulsion polymerizing a polymer-gel-particle forming monomer in the presence of a crosslinking monomer and the reactive-functional-group-introduced host molecules obtained in the reactive-functional-group-introducing step so as to obtain molecule-responsive gel particles.

According to the arrangement, molecule-responsive gel particles which recognize specific molecules and change in size are produced in a suitable manner.

The host molecules are preferably at least one or more types of molecules selected from the group consisting of cyclodextrin, crown compounds, cyclophane, calixarene, and derivatives thereof.

Preferably, the polymer-gel-particle forming monomer has a single polymerizable C=C double bond; and the crosslinking monomer is hydrophilic. The monomer having a single polymerizable C=C double bond is more preferably a hydrophobic monomer.

Letting a net amount of the monomer having a single polymerizable C=C double bond and the hydrophilic crosslinking monomer be 100 mol %, the crosslinking monomer is preferably used within a range of 0.1 to 50 mol %.

The host molecules preferably account for 0.1 to 40 mol % of a net amount of the host molecules and all the feedstock monomers.

The method of detecting a target molecule in accordance with the present invention is characterized in that it includes the steps of: causing a specimen to contact the molecule-responsive gel particles; and determining whether or not the specimen contains a target molecule by means of a change in volume of the molecule-responsive gel particles. In addition, the target molecule detection kit in accordance with the present invention is characterized in that it includes the molecule-responsive gel particles.

According to the arrangement, a target molecule is readily detected by detecting a change in volume occurring in response to specific molecules.

The target-substance-adsorption/removal material in accordance with the present invention is characterized in that it includes the molecule-responsive gel particles.

According to the arrangement, specific molecules are removed by adsorption, and if the adsorption/removal happens, it is known by means of a change in volume.

ADVANTAGEOUS EFFECTS OF INVENTION

The molecule-responsive gel particle in accordance with the present invention is, as described in the foregoing, a molecule-responsive gel particle changing in volume in response to a target molecule and includes: a polymer gel particle having a crosslinked structure; and a plurality of clathrate compound-forming host molecules fixed to the polymer gel particle. Hence, two or more of the plurality of host molecules clathrate different atomic groups in the target molecule so that the two or more host molecules and the target molecule form a new crosslink in the molecule-responsive gel particle, which changes the volume of the molecule-responsive gel particle.

The method of producing molecule-responsive gel particles in accordance with the present invention, as described in the foregoing, includes: the reactive-functional-group-introducing step of introducing reactive functional groups to at least one type of host molecules; and the polymerization step of emulsion polymerizing a polymer-gel-particle forming monomer in the presence of a crosslinking monomer and the reactive-functional-group-introduced host molecules obtained in the reactive-functional-group-introducing step so as to obtain molecule-responsive gel particles. Hence, molecule-responsive gel particles which recognize specific molecules and change in size are produced in a suitable manner.

Additional objectives, advantages and novel features of the invention will be set forth in part in the description which follows.

BRIEF DESCRIPTION OF DRAWINGS

FIG. 1 is an illustration of a chemical reaction equation for the production of molecule-responsive gel particles in an example of the invention.

FIG. 2

FIG. 2 is a graph representing a relationship between the CD content and the average diameter of molecule-responsive gel particles in an aqueous solution of bisphenol A (BPA).

FIG. 3

FIG. 3 is a graph representing a relationship between the CD content and the relative change of the average diameter of molecule-responsive gel particles in an aqueous solution of bisphenol A (BPA).

FIG. 4 is a schematic illustration of a molecule-responsive gel particle changing its volume in response to target molecules.

DESCRIPTION OF EMBODIMENTS

Figure 1:
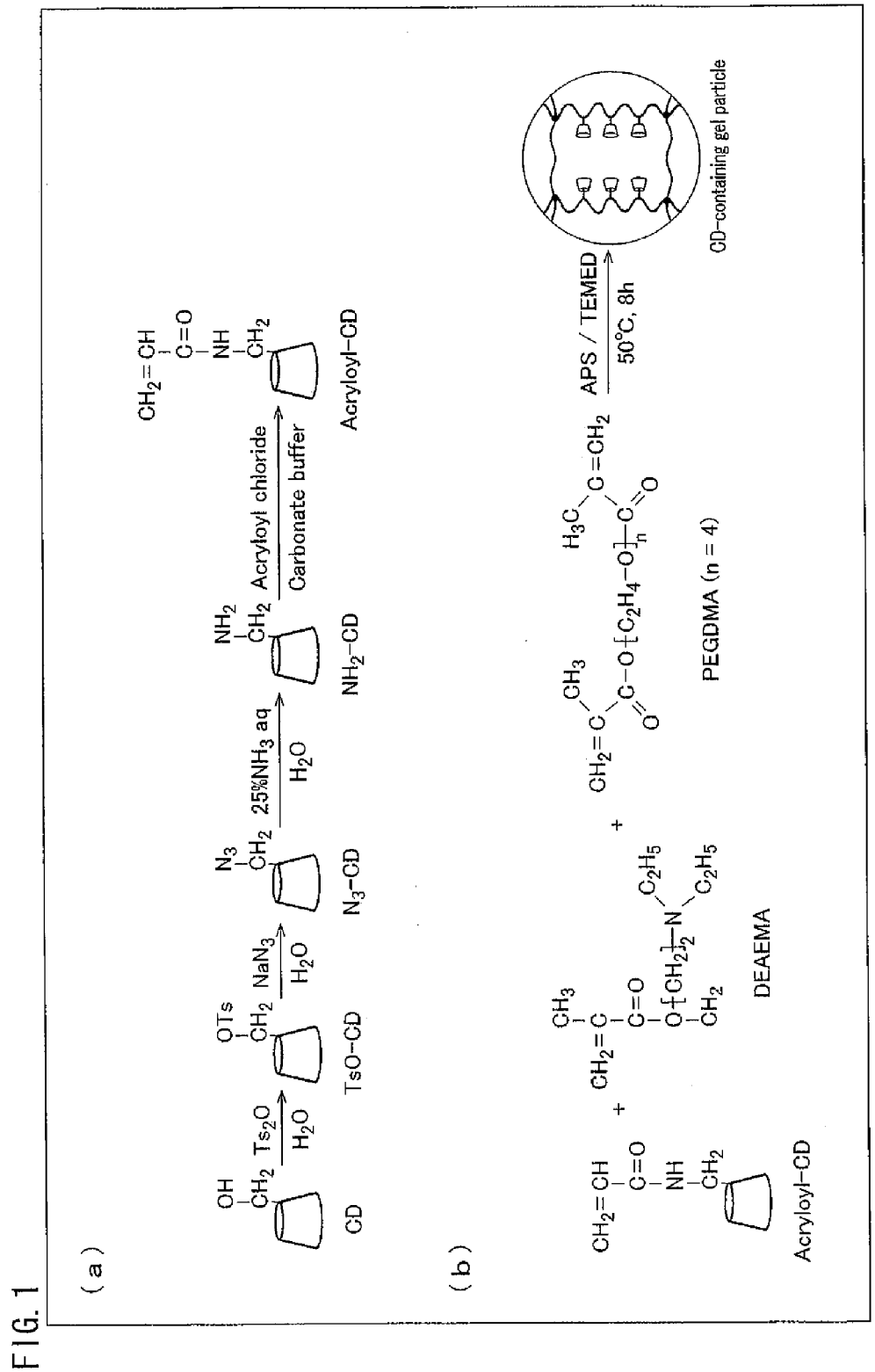
FIG. 1

The following will describe the present invention in the order of (I) the molecule-responsive gel particles, (II) the method of production for the molecule-responsive gel particles, and (III) the use of the molecule-responsive gel particles.

(I) Molecule-Responsive Gel Particles

The molecule-responsive gel particles in accordance with the present invention are molecule-responsive gel particles changing in volume in response to a target molecule and each include: a polymer gel particle having a crosslinked structure; and a plurality of clathrate compound-forming host molecules fixed to the polymer gel particle.

The polymer gel particles are particles made of a polymer compound having a crosslinked structure. The particles are not limited in any particular manner so long as they have absorbed liquid and swollen.

The type of crosslinking is not limited in any particular manner so long as the polymer gel particles have a crosslinked structure. From the stability viewpoint, however, the crosslinked structure of the polymer gel particles is preferably chemically formed by covalent bonding.

The molecule-responsive gel particles in accordance with the present invention change their swell, and hence their volume, in response to a specific molecule, and are a type of stimuli-responsive gel. The stimuli-responsive gel here refers to a polymer gel which changes its swell, and hence its volume, in response to temperature, pH, ionic strength, light, electric field, and specific molecules, for example.

The molecule-responsive gel particles in accordance with the present invention are responsive to specific molecules when the particles have absorbed liquid and swollen. Therefore, the molecule-responsive gel particles in accordance with the present invention are preferably swollen by absorption of liquid.

The liquid is not limited in any particular manner and may be any liquid so long as it does not undesirably affect the response to target molecules. Examples of the liquid may include water; aqueous buffer solutions, such as a phosphate buffer solution, a Tris buffer solution, and an acetate buffer solution; alcohols, such as methanol, ethanol, 1-propanol, 2-propanol, 1-butanol, 2-butanol, isobutyl alcohol, and isopentyl alcohol; ketones, such as acetone, 2-butanone, 3-pentanone, methyl isopropyl ketone, methyl n-propyl ketone, 3-hexanone, and methyl n-butyl ketone; ethers, such as diethyl ether, diisopropyl ether, tetrahydrofuran, and tetrahydropyran; esters, such as ethyl acetate ester; amides, such as dimethyl formamide and dimethyl acetoamide; dimethyl sulfoxide; nitriles, such as cetonitrile; propylene carbonate; lower saturated hydrocarbons, such as pentane, hexane, and cyclohexane; xylene; toluene; and mixtures of these substances. Particularly, the liquid is preferably either water or an aqueous buffer solution in view of the stability of the clathrate compound formed by the bonding of host molecules and a target molecule. In other words, the molecule-responsive gel particles in accordance with the present invention are preferably a hydrogel.

The amount of the liquid contained in the polymer gel particles swollen to equilibrium can vary depending on the crosslink density of the polymer gel particles, the type of the polymer and solvent, temperature, pH, ionic strength, etc.

The amount is preferably not less than 30 wt % and not more than 99.9 wt %, and more preferably not less than 70 wt % and not more than 99 wt %, when expressed in ratio to the net weight of the molecule-responsive gel particles and the liquid contained in the molecule-responsive gel particles. The ratios in that range, of the liquid contained in the molecule-responsive gel particles in accordance with the present invention which are swollen to equilibrium, are preferred because they deliver a gel with suitable strength and a polymer network structure in which target molecules can diffuse in the gel.

The molecule-responsive gel particles in accordance with the present invention have absorbed liquid and swollen. The particles may be dried so that the obtained dry product can be redispersed in liquid to provide molecule-responsive gel particles for use. Therefore, the dry product also falls within the scope of the present invention.

The molecule-responsive gel particles in accordance with the present invention have an average diameter of preferably 10 nm to 50 µm, more preferably 50 nm to 10 µm, and even more preferably 100 nm to 1 µm. The molecule-responsive gel particles preferably have an average diameter of not less than 10 nm because their dispersion is visually observable. In addition, the molecule-responsive gel particles preferably have an average diameter of not more than 50 µm because the particles are quick to respond to target molecules and suitable for micrometer-scale applications, for example, in microchips.

The molecule-responsive gel particles in accordance with the present invention has a polydispersity index (p.d.) of preferably less than 0.1 and more preferably less than 0.01. These polydispersity index values are preferred because the particles have uniform size and produce stable information on response behavior. That in turn yields reliable results when the particles are used in a sensor, for example.

In the present invention, the average diameter of the molecule-responsive gel particles refers to the value obtained by histogram analysis of a scattering intensity distribution that is attributable to particles detected by dynamic light scattering described in the examples of the invention which will be detailed later. Also, in the present invention, the polydispersity index (p.d.) of the molecule-responsive gel particles refers to the value obtained by first finding a series expansion, up to a second-order term, of the exponential part of the auto-correlation function obtained from scattering intensity that is attributable to particles detected by dynamic light scattering described in the examples of the invention (will be detailed later) and subsequently standardizing the second-order term coefficient by the square of the first-order term coefficient. A polydispersity index greater than 0.1 indicates polydispersity (multiple peaks or a single, but broad peak). A polydispersity index less than or equal to 0.1 indicates monodispersity (presence of a pointed peak).

In the molecule-responsive gel particle in accordance with the present invention, a plurality of clathrate compound-forming host molecules are fixed inside the crosslinked structure of the polymer gel particle. A host molecule here is not limited in any particular manner so long as it is a compound capable of clathrating a target molecule (or atomic groups in a target molecule) in the host molecule, that is, a compound which clathrates a target molecule (or atomic groups in a target molecule) to form a clathrate compound.

A clathrate compound here is a compound of two types of molecules formed under appropriate conditions, with one type (host molecules) including the other type (guest molecules). A guest molecule here is not necessarily a molecule; it also includes atomic groups in a molecule. Therefore, throughout the rest of the specification, what is referred to by the term, "guest molecule" is inclusive of atomic groups in a guest molecule, as well as that guest molecule itself. Molecular interaction occurs between the host molecules including another molecule and the included guest molecule. It is a vital requirement for the generating of a clathrate compound that the size of a cavity provided by the host molecules matches the size of the guest molecule to be included.

The host molecules of such a nature can selectively capture a guest molecule. Furthermore, the host molecules and the guest molecule can be separated again in the clathrate compound formed by the host molecules capturing the guest molecule because the two types of molecules are bonded by ionic bonds, van der Waals bonds, hydrogen bonds, or similar relatively weak bonds. Therefore, the molecule-responsive gel particles in accordance with the present invention in which the host molecules are fixed to the polymer gel particles can be used repeatedly in selective separation of substance, sensors, adsorption/removal, etc.

The guest-molecule-including structure of the host molecules in the present invention is not limited in any particular manner and may be, for example, an inclusion type, a tube type, a layer type, a cage type, a package type, or any other appropriate type.

The host molecules are not limited in any particular manner so long as they can form the clathrate compound described above. Examples may include cyclodextrin, crown compounds, cyclophane, azacyclophane, calixarene, and derivatives thereof. These compounds have a ring structure with an inner hole where specific molecules can be recognized and clathrated depending on the size, volume, and shape of the hole.

Some specific examples of cyclodextrin are α-cyclodextrin; β-cyclodextrin; γ-cyclodextrin; and cyclodextrin derivatives, such as alkylated derivatives, hydroxyalkylated derivatives, glucosylated derivatives, carboxymethylated derivatives, and sulfobutyletherified derivatives in which some of the OH groups are replaced, respectively, by alkoxy groups, —OCH$_2$CH(OH)CH$_3$ or similar groups, —O-glucose or similar groups, —OCH$_2$COOH or similar groups, and —O(CH$_2$)$_4$SO$_3$Na or similar groups.

The host molecules are fixed inside the crosslinked structure of the polymer gel particles in the present invention. Accordingly, two or more of the host molecules clathrate different atomic groups in a target molecule in the presence of target molecules each containing two or more atomic groups which can be clathrated by the host molecules so that the two or more host molecules and the target molecule form a new crosslink in the molecule-responsive gel particle.

Figure 4:
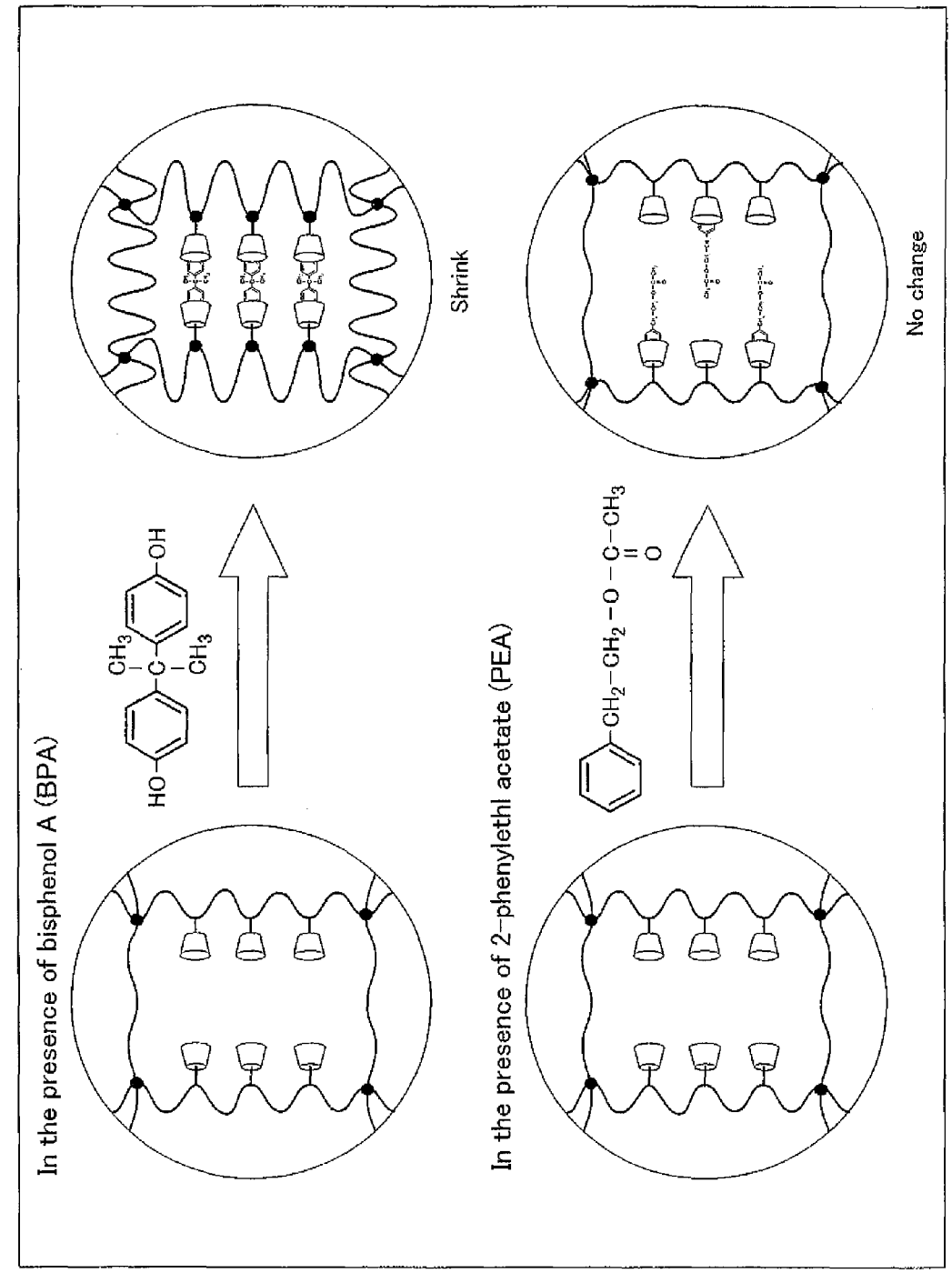
FIG. 4

For example, the circled schematic in the upper left corner of FIG. 4 shows host molecules (represented by conical trapezoids) being fixed in a crosslinked structure of a polymer gel particle. As the molecule-responsive gel particle in accordance with the present invention is brought into contact with target molecules (bisphenol A (BPA) in the top of FIG. 4) containing two or more atomic groups (aromatic rings in FIG. 4) to be clathrated by the host molecules, the two or more host molecules clathrate the two atomic groups in the target molecules. The result, shown in the circled schematic in the upper right corner of FIG. 4, is the formation of a crosslinked structure composed of host molecule-target molecule-host molecule complexes. The black dots in FIG. 4 indicate crosslinking sites. The molecule-responsive gel particle shrinks with the increase in the number of the crosslinking sites, as it is known that the swell ratio of polymer gel generally increases with a decrease in crosslink density.

In contrast, in the presence of molecules each containing a single atomic group which can be clathrated by the host molecules, the molecule-responsive gel particle in accordance with the present invention clathrates the atomic group to form bonds as shown in the bottom of FIG. 4, but is short of forming a crosslinked structure. Therefore, the molecule-responsive gel particle does not change in volume.

All stimuli-responsive gel particles reported conventionally respond to stimuli based on, for example, changes of dissociable groups or changes in affinity between the solvent and the polymer compound constituting the particles. It is difficult to impart molecule recognizing capability to the conventional particles which operate by the conventional mechanisms. The molecule-responsive gel particles in accordance with the present invention operate by a completely different mechanism from the conventional stimuli-responsive particles: the crosslinking sites increase in the presence of target molecules, thus causing change in volume. This mechanism imparts molecule recognizing capability to the particles.

In addition, large volume change may be available with the molecule-responsive gel particles in accordance with the present invention, depending on the structural design of the molecule-responsive gel particles, because the particles employ the mechanism whereby the crosslinking sites increase in number and change the volume in the presence of target molecules each containing two or more atomic groups which can be clathrated by the host molecules as described above.

For the molecule-responsive gel particles in accordance with the present invention, it is not limited in any particular manner how the host molecules are fixed to the polymer gel particles having a crosslinked structure. Preferred example methods are chemical bonds including covalent bonds, ionic bonds, and coordinate bonds. Among them, covalent bonds are the most preferable example. The chemical bonds stably fix the host molecules in the crosslinked structure of the polymer gel particles. More specifically, the host molecules can be appropriately fixed to the polymer gel particles having a crosslinked structure by introducing reactive functional groups to the host molecules and reacting the reactive functional groups with a polymer compound which will form polymer gel particles.

In the present invention, plural host molecules need to be fixed in the crosslinked structure of the polymer gel particles. Accordingly, the polymer gel particles can form a crosslinked structure from the host molecules and a target molecule containing two or more atomic groups which can be clathrated by the host molecules.

The host molecules here may be of a single type or a combination of two or more types. A choice may be made according to the target molecule. By combining two or more different types of host molecules, molecule-responsive gel particles can be produced which respond to molecules each containing two or more types of atomic groups which can be clathrated by the two or more different types of host molecules.

The polymer gel particles which may be used to prepare the molecule-responsive gel particles in accordance with the present invention are not limited in any particular manner so long as they are a polymer compound with a crosslinked structure and swell in water or an organic solvent. Any polymer compound that is used to synthesize conventional stimuli-responsive gel particles may be preferably used. An example of such polymer gel particles is the polymer gel particles described in patent literature 1 and non-patent literatures 3 and 4.

A more preferred example of the polymer gel particles than the conventional polymer gel particles is the particles obtained by emulsion polymerization of a monomer having a single polymerizable C=C double bond and a hydrophilic crosslinking monomer. Accordingly, the method has an advantage in that stable gel particles are synthesized without using an emulsifier.

The monomers having a single polymerizable C=C double bond are not limited in any particular manner; any monomer that can be generally used in a radical polymerization reaction may be used. Examples of the monomer having a single polymerizable C=C double bond include monomers with vinyl groups, allyl groups, iso propenyl groups, or (meth)acryloyl groups. More specifically, the monomer having a single polymerizable C=C double bond may be, for example, a C1 to C18 alkyl(meth)acrylate monomer; a vinyl aromatic monomer, such as styrene, α-methyl styrene, p-methyl styrene, chlorostyrene, or vinyl toluene; a vinyl ether monomer; a vinyl ester, such as vinyl acetate; or a vinyl-unsaturated carboxylic acid monomer, such as methacrylic acid, acrylic acid, maleic acid, or itaconic acid.

The monomer having a single polymerizable C=C double bond is more preferably a hydrophobic monomer. Specific examples of the hydrophobic monomer include (meth)acrylate monomers, such as 2-(N,N-dialkylamino)alkyl(meth)acrylate and 2-hydroxyethyl(meth)acrylate; vinyl ether monomers; vinyl acetate; and styrenes.

Among them, particularly preferred examples of the hydrophobic monomer are 2-(N,N-dialkylamino)alkyl(meth)acrylate, 2-hydroxyethyl(meth)acrylate, and like (meth)acrylate monomers. A further preferred example is 2-(N,N-dialkylamino)alkyl(meth)acrylate.

The hydrophilic crosslinking monomer used in the present invention is not limited in any particular manner so long as it is a hydrophilic monomer having two or more polymerizable C=C double bonds. The hydrophilic monomer is preferably a crosslinking monomer having a solubility of 0.01 g or greater in 100 g of water at 20° C. The hydrophilic crosslinking monomer may be, for example, polyethylene glycol di(meth)acrylate, polypropylene glycol di(meth)acrylate, polyethylene glycol tri(meth)acrylate, polypropylene glycol tri(meth)acrylate, methylene bisacrylamide, or polyalkylene glycol divinyl ether. The use of a hydrophilic crosslinking monomer having two or more polymerizable C=C double bonds is preferred because gel particles are synthesized which exhibit good disperse stability and a suitable swell ratio with reversible swell/shrink capability.

The hydrophilic crosslinking monomer is preferably a compound which has two or more polymerizable C=C double bonds and a polyalkylene glycol chain. It is more preferable if the polyalkylene glycol chain is an alkylene glycol chain of general formula (1)

$$—(RO)_n—\qquad(1)$$

where in general formula (1), R is an alkylene group of carbon number 1 to 6 and may or may not vary from one RO repeat unit to another, and n is an integer from 2 to 20. It has been discovered that a hydrophilic crosslinking monomer having such a polyalkylene glycol chain and two or more polymerizable C=C double bonds has an additional dispersion stabilizer function. This property enables production of molecule-responsive gel particles with excellent molecule recognizing capability without need to add a dispersion stabilizer which may have adverse effect on the molecule recognizing capability of the produced molecule-responsive gel particles. The crosslinking monomer may be, for example, polyethylene glycol di(meth)acrylate, polypropylene glycol di(meth)acrylate, polyethylene glycol tri(meth)acrylate, polypropylene glycol tri(meth)acrylate, or polyalkylene glycol divinyl ether. In the present invention, it is preferable to use the crosslinking monomer which has an additional dispersion stabilizer function and use no dispersion stabilizer. The invention however does not prohibit the use of dispersion stabilizer.

The hydrophilic crosslinking monomer is preferably a polyalkylene glycol di(meth)acrylate having an alkylene glycol chain with the repetition of RO units, i.e. "n" in general formula (1), being two or greater, and more preferably with the repetition of RO units being 2, 3, 4, 9, or 13. Examples of the polyalkylene glycol di(meth)acrylate include polyethylene glycol dimethacrylate, polyethylene glycol diacrylate, polypropylene glycol dimethacrylate, polypropylene glycol diacrylate, polytetraethylene glycol dimethacrylate, polytetramethylene glycol diacrylate, poly(ethylene glycol-tetramethylene glycol) di(meth)acrylate, poly(propylene glycol-tetramethylene glycol) di(meth)acrylate, and polyethylene glycol-polypropylene glycol-polyethylene glycol di(meth) acrylate.

The term "(meth)acrylic" is used to mean both "acrylic" and "methacrylic" throughout the specification.

Only one of these crosslinking monomers may be used. Alternatively, two or more of them may be used in combination. The same applies to the monomer having a single polymerizable C=C double bond.

Other monomers may also be used together provided that they do not have adverse effect on the response to molecules of the produced molecule-responsive gel particles.

The crosslinking monomer is used preferably in 0.1 to 50 mol %, more preferably in 1 to 50 mol %, and even more preferably in 10 to 30 mol %, with respect to the net amount of the monomer having a single polymerizable C=C double bond and the hydrophilic crosslinking monomer. The use of the crosslinking monomer in 0.1 mol % or more is preferred because the dispersion stabilizer effect improves the disperse stability of the particles. The use of the crosslinking monomer in 50 mol % or less is preferred because gel particles are synthesized which have such a suitable crosslink density that the particles can show a large change in size in response to target molecules.

The host molecules are used preferably in 0.1 to 40 mol %, more preferably in 1 to 40 mol %, and even more preferably in 5 to 20 mol %, with respect to the net amount of the host molecules and all the feedstock monomers. The use of the host molecules in 0.1 mol % or more is preferred because the host molecules form relatively large numbers of crosslinks by clathrating target molecules, showing a large response to the target molecules. The use of the host molecules in 40 mol % or less is preferred because gel particles with suitable stability are readily synthesized. All the feedstock monomers here refers to the sum of the monomer having a single polymerizable C=C double bound and the hydrophilic crosslinking monomer if these monomers are only used. If other monomers are used together, the term refers to all the feedstock monomers including those additional monomers.

The molecule-responsive gel particles in accordance with the present invention, when they are swollen, can recognize target molecules containing two or more atomic groups which can be clathrated by the host molecules. Furthermore, the molecule-responsive gel particles in accordance with the present invention change in volume in response to target molecules containing two or more atomic groups which can be clathrated by the host molecules. The liquid absorbed when the molecule-responsive gel particles in accordance with the present invention change in volume is not limited in any particular manner; the liquid may be water, an aqueous buffer solution, or an organic solvent. The liquid may be a liquid which the molecule-responsive gel particles absorb and swell. Specific examples of the liquid include water; an aqueous buffer solutions, such as a phosphate buffer solution, a Tris buffer solution, and an acetate buffer solution; alcohols, such as methanol, ethanol, 1-propanol, 2-propanol, 1-butanol, 2-butanol, isobutyl alcohol, and isopentyl alcohol; ketones, such as acetone, 2-butanone, 3-pentanone, methyl isopropyl ketone, methyl n-propyl ketone, 3-hexanone, and methyl n-butyl ketone; ether, such as diethyl ether, diisopropyl ether, tetrahydrofuran, and tetrahydropyran; esters, such as ethyl acetate ester; amides, such as dimethyl formamide and dimethyl acetoamide; dimethyl sulfoxide; nitriles, such as acetonitrile; propylene carbonate; lower saturated hydrocarbons, such as pentane, hexane, and cyclohexane; xylene; toluene; and mixtures of two or more of these substances. Especially preferred among the examples are water and aqueous buffer solutions in view of the stability of the clathrate compound formed by the host molecules bonding to a target molecule.

The molecule-responsive gel particles in accordance with the present invention, when swollen to equilibrium, can better recognize target molecules containing two or more atomic groups which can be clathrated by the host molecules.

The magnitude of the change in volume when the molecule-responsive gel particles in accordance with the present invention change in volume in response to target molecules is not limited in any particular manner. The ratio of particle diameters before and after the change in volume, or the ratio of the average particle diameter after the change in volume to the average particle diameter before the change in volume, is preferably 0.8 or less, more preferably 0.5 or less, and even more preferably 0.2 or less. Smaller particle diameter ratios are preferred because the particles shrink more and show improved sensitivity. The typical particle diameter ratio of the molecule-responsive gel particles in accordance with the present invention is about 0.5 although it can vary depending on the number of crosslinks introduced in the crosslinked structure, the type of the polymer compound and the solvent, the condition of the dissociable groups in the polymer chain, and possibly other factors.

The molecule-responsive gel particles in accordance with the present invention may also be labelled, for example, with silica or other particles, color material, or molecules containing fluorescent chromophores. The use of the molecule-responsive gel particles enables simple and convenient detection of the change in volume of the molecule-responsive gel particles either visually or by using a device, such as a spectroscope or a fluorescence microscope.

(II) Method of Producing Molecule-Responsive Gel Particles

The method of producing molecule-responsive gel particles in accordance with the present invention is not limited in any particular manner and may be any method so long as the host molecules can be fixed in the crosslinked structure of the polymer gel particles.

The method of producing molecule-responsive gel particles in accordance with the present invention may be, for example, a method of production involving: the reactive-functional-group-introducing step of introducing reactive functional groups to at least one type of host molecules; and the polymerization step of emulsion polymerizing a polymer-gel-particle forming monomer in the presence of a crosslinking monomer and the reactive-functional-group-introduced host molecules obtained in the reactive-functional-group-introducing step so as to obtain molecule-responsive gel particles.

The host molecules have been already described earlier in (I), which is not repeated here. The reactive functional groups used in the reactive-functional-group-introducing step are not limited in any particular manner so long as they can be incorporated into a polymer compound constituting the crosslinked structure of the polymer gel particles through emulsion polymerization. Examples include polymerizable functional groups, such as (meth)acryloyl groups and vinyl groups. The method of introducing the reactive functional groups is not limited in any particular manner; any publicly known, conventional method may be used.

In the polymerization step, a polymer-gel-particle forming monomer is polymerized in the presence of a crosslinking monomer and reactive-functional-group-introduced host molecules to obtain molecule-responsive gel particles.

The polymerization method here, although not limited in any particular manner, is preferably emulsion polymerization. Accordingly, a molecule-responsive gel can be obtained in the form of particles. The solvent used in the polymerization is preferably, for example, water, a phosphate buffer solution, a Tris buffer solution, an acetate buffer solution, methanol, or ethanol.

More preferably, the polymerization is carried out by emulsion polymerization involving no use of emulsifier (no surfactant). The solvent in the emulsifier-free emulsion polymerization is preferably, for example, water, a phosphate buffer solution, a Tris buffer solution, or an acetate buffer solution.

In the emulsion polymerization and the emulsifier-free emulsion polymerization, a reaction solution containing the polymer-gel-particle forming monomer, the reactive-functional-group-introduced host molecules, and the crosslinking monomer may be stirred with ultrasonic waves prior to the polymerization.

The monomer used in the production of the molecule-responsive gel particles in accordance with the present invention has been already described earlier in (I), which is not repeated here.

The polymerization initiator is not limited in any particular manner. Preferred examples include persulfuric acid salts, such as ammonium persulfate and sodium persulfate; hydrogen peroxide; peroxides, such as t-butylhydroperoxide and cumene hydroperoxide; azobisisobutyronitrile; and benzoyl peroxide. Among these polymerization initiators, oxidative initiators, especially, persulfuric acid salts and peroxides, may also be used in combination with, for example, sodium hydrogen sulfite or N,N,N',N'-tetramethyl ethylenediamine as a redox initiator.

Polymerization temperature, although not limited in any particular manner, is preferably 5 to 90° C., and more preferably 20 to 40° C. At polymerization temperature in these ranges, the polymerization does not require heating. Molecules that could be denatured depending on temperature can be used. Polymerization time is not limited in any particular manner either; it is typically 4 to 12 hours.

The concentrations of the monomers and crosslinking agent during the polymerization is not limited in any particular manner so long as the polymer gel particles are obtained. The concentration of the polymerization initiator is not limited in any particular manner either; it may be determined appropriately.

Furthermore, the host molecules may be copolymerized not only with the polymer-gel-particle forming monomer and the crosslinking monomer, but also with another monomer, in the polymerization step. The other monomer is not limited in any particular manner so long as the monomer does not have adverse effect on the performance of the obtained molecule-responsive gel particles.

The method of producing molecule-responsive gel particles in accordance with the present invention more preferably further includes the step of removing unreacted monomer, unreacted crosslinking monomer, etc. from the obtained reaction mixture in the polymerization step. The method of removing unreacted monomer, crosslinking agent, etc. is not limited in any particular manner; they may be removed by, for example, dialysis or centrifugation. The molecule-responsive gel particles in accordance with the present invention are preferably a hydrogel or an organogel, and may be in dry state. The molecule-responsive gel particles in accordance with the present invention in dry state can be obtained by, for example, removing solvent from washed molecule-responsive gel particles and freeze drying the particles.

The method of producing molecule-responsive gel particles in accordance with the present invention is preferably one of the methods described above. An alternative example is to polymerize the monomers to synthesize polymer gel particles and subsequently bond two or more host molecules in the crosslinked structure of the polymer gel particles.

(III) Use of Molecule-Responsive Gel Particles (III-1) Method of Detecting Target Molecules Using Molecule-Responsive Gel Particles The host molecules are fixed inside the crosslinked structure of the polymer gel particles in the present invention. Accordingly, two or more of the host molecules clathrate different atomic groups in a target molecule in the presence of target molecules each containing two or more atomic groups which can be clathrated by the host molecules so that the two or more host molecules and the target molecule form a new crosslink in the molecule-responsive gel particle, which shrinks the molecule-responsive gel particle. Therefore, The molecule-responsive gel particles in accordance with the present invention can be used to detect target molecules. Therefore, the present invention encompasses methods of detecting target molecules using the molecule-responsive gel particles in accordance with the present invention. The target molecule, throughout the specification, refers to a molecule which contains two or more atomic groups which can be clathrated by the host molecules fixed to the molecule-responsive gel particles in accordance with the present invention and in response to which the molecule-responsive gel particles in accordance with the present invention change in volume.

The method of detecting a target molecule in accordance with the present invention may include the steps of: causing a specimen to contact the molecule-responsive gel particles in accordance with the present invention; and determining whether or not the specimen contains a target molecule by means of a change in volume of the molecule-responsive gel particles.

The target molecule contained in the specimen is a molecule containing two or more atomic groups which can be clathrated by the host molecules fixed to the molecule-responsive gel particles in accordance with the present invention, so as to form a clathrate compound. Some preferred combinations of the host molecules and the target molecules are cyclodextrin and a compound having two or more aromatic rings; crown ether and a compound having two or more amino groups; and cyclophane and a compound having two or more aromatic rings. Therefore, the detection method in accordance with the present invention is capable of properly detecting, for example, endocrine disrupting chemicals, such as bisphenol A with two aromatic rings, biphenyl compounds, and phenol derivatives, and toxic substances, such as dioxin.

The specimen is by no means limited to an aqueous or buffer solution of target molecules so long as the target molecule can be detected using the molecule-responsive gel particles in accordance with the present invention.

The molecule-responsive gel particles which contact the specimen are preferably used, for example, in the form of dispersion liquid in which the molecule-responsive gel particles are dispersed in a dispersion medium. The dispersion medium here may be, for example, water, a phosphate buffer solution, a Tris buffer solution, an acetate buffer solution, methanol, or ethanol. The quantity of the molecule-responsive gel particles, dispersed in the dispersion liquid, which contact the specimen is not limited in any particular manner and preferably 0.01 to 10 g/L and more preferably 0.01 to 0.1 g/L. Controlling the quantity of the molecule-responsive gel particles in the dispersion substance within these ranges is preferred because the dispersion is visually observable and synthesis cost is reduced.

The method of determining whether or not the specimen contains a target molecule by means of a change in volume of the molecule-responsive gel particles may be any publicly known, conventional method of detecting change in volume of a stimuli-responsive gel and is not limited in any particular manner. Examples of such a method include repetitive measurements of the diameters of the molecule-responsive gel particles in the liquid by dynamic scattering or a like technique, microscopic observation of the change in volume, measurement of changes in wavelength and intensity of the structural color produced by regular arrangement of silica or like particles in the molecule-responsive gel particles, measurement of light transmittance by the molecule-responsive gel particles when a color material is dispersed in the particles, and measurement of fluorescence power of molecules or a like substance, containing fluorescent chromophores, which is introduced to the molecule-responsive gel particles.

(III-2) Target Molecule Detection Kit

The present invention, related to use of the molecule-responsive gel particles, encompasses not only the method of detecting target molecules described above, but also target molecule detection kits with which the detection method is carried out. Specifically, the target molecule detection kit in accordance with the present invention includes at least the molecule-responsive gel particles in accordance with the present invention. The detection kit may further include various buffers and diluents.

By using the target molecule detection kit, the method of detecting target molecules in accordance with the present invention can be carried out easily and simply. That in turn enables the present invention to be used in the environmental examination, clinical test, and pharmaceutical fields on an industrial scale.

(III-3) Target-Substance-Adsorption/Removal Material

The host molecules are fixed inside the crosslinked structure of the polymer gel particles in the present invention. Accordingly, two or more of the host molecules clathrate different atomic groups in a target molecule in the presence of target molecules each containing two or more atomic groups which can be clathrated by the host molecules so that the two or more host molecules and the target molecule form a new crosslink in the molecule-responsive gel particle, which shrinks the molecule-responsive gel particle. Therefore, the molecule-responsive gel particles in accordance with the present invention can be used as target-molecule-adsorption/removal material. Therefore, the present invention also encompasses target-substance-removal to material prepared using the molecule-responsive gel particles in accordance with the present invention.

The target-substance-adsorption/removal material in accordance with the present invention is capable of not only adsorbing and removing target molecules, but also changing in volume upon the adsorption/removal of the target substances. Therefore, the adsorption/removal of the target molecules can be simultaneously confirmed.

EXAMPLES

The following will describe the present invention more specifically by way of examples. The present invention is nonetheless by no means limited by the examples.

Example 1

Production of Molecule-Responsive Gel Particles

Polymerizable functional groups were introduced to cyclodextrin (CD) which as a host molecule recognizes, for example, an aromatic ring. The CD into which polymerizable functional groups had been introduced were copolymerized with 2-(N,N-diethylamino) ethyl methacrylate (DEAEMA) by emulsifier-free emulsion polymerization by using polyethylene glycol dimethacrylate (PEGDMA) as a hydrophilic crosslinking agent and particle stabilizer, to synthesize gel particles into which the CD were introduced. Gel particles with different CD contents were also synthesized. The respond behavior of these gels were examined in detail.

Synthesis of Host Molecules to which Acryloyl Groups are Introduced

First, acryloyl-β-cyclodextrin (acryloyl-CD) was synthesized by the process shown in FIG. 1(a). β-cyclodextrin ("CD" in FIG. 1(a); manufactured by Wako Pure Chemical Ind., 11.5 g) and toluenesulfonic anhydride ($Ts_2O$, 4.9 g) were added to water (250 mL) and stirred at room temperature for 2 hours, to prepare a suspension. A 0.1-g/mL aqueous solution of sodium hydroxide (50 mL) was added and stirred intensely for 10 minutes. Thereafter, unreacted $Ts_2O$ was quickly filtered out. The filtrate was neutralized using concentrated hydrochloric acid and subsequently left to sit in a refrigerator overnight to precipitate tosylated CD (TsO-CD). Next, TsO-CD (4.7 g) and azidated sodium (3.0 g) were added to 80° C. water (50 mL) and stirred at 80° C. for 5 hours to run reaction. The reaction solution was cooled down to room temperature and added to acetone (300 mL) to precipitate $N_3$-CD which was then sucked up, filtered, and dried under reduced pressure. The obtained $N_3$-CD (3.0 g) and triphenyl phosphine (1.5 g) were dissolved in N,N-dimethyl formamide (50 mL). A 25% aqueous solution of ammonia (10 mL) was then added to the solution and stirred at room temperature for 4 hours. The resultant solution was added to acetone (300 mL) to precipitation $NH_2$-CD which was then sucked up, filtered, and dried under reduced pressure, to obtain 6-amino-6-deoxy-cyclodextrin ($NH_2$-CD). Next, the $NH_2$-CD (3.4 g) was added to carbonate buffer solution (50 mL, pH 11), and acryloyl chloride (2.7 g) was added dropwise to the solution. The resultant solution was stirred for 2 hours in an ice bath to run reaction. The solution was added to acetone (300 mL) to precipitate products which were sucked up, filtered, and dried under reduced pressure, to synthesize acryloyl-6-amino-6-deoxy-cyclodextrin (acryloyl-CD).

Production of Molecule-Responsive Gel Particles

As illustrated in FIG. 1(b), the synthesized acryloyl-CD, 2-(N,N-diethylamino) ethyl methacrylate (DEAEMA), polyethylene glycol dimethacrylate (PEGDMA) with 4 EO repeat units, and distilled water were placed in a sample tube in such amounts as to achieve the compositions shown in Table 1 below and stirred by ultrasonic wave for 30 minutes. Thereafter, 5 mL was removed from the sample tube and put in a test tube where the sample was stirred with a stirring bar at 500 rpm. To the resultant sample, ammonium persulfate/tetramethyl ethylenediamine (APS/TEMED) was added as a redox initiator, and the mixture was reacted at 50° C. for 8 hours to synthesize molecule-responsive gel particles. Table 1 shows monomer compositions for the synthesis of molecule-responsive gel particles and the particle diameter and polydispersity index of the obtained particles.

TABLE 1

| Acryloyl-CD Content (mol %) | Monomer Mixture (mg) | | | Water (g) | Particle Diameter (nm) | p.d. |
| --- | --- | --- | --- | --- | --- | --- |
| | Acryloyl-CD | DEAEMA | PEGDMA | | | |
| 0 | 0.00 | 12.04 | 5.70 | 50.00 | 193.9 | 0.03082 |
| 1 | 0.77 | 11.92 | 5.70 | 50.00 | 286.5 | 0.00100 |
| 3 | 2.31 | 11.67 | 5.70 | 50.00 | 298.7 | 0.00276 |
| 5 | 3.85 | 11.44 | 5.70 | 50.00 | 316.9 | 0.01726 |
| 7 | 5.39 | 11.20 | 5.70 | 50.00 | 300.3 | 0.08461 |
| 9 | 6.93 | 10.95 | 5.70 | 50.00 | 327.6 | 0.01504 |

The dispersion liquid of the obtained molecule-responsive gel particles was stable and had opaque white color. The particle diameter of the molecule-responsive gel particles was determined by dynamic light scattering as follows.

The dispersion liquid was diluted with ion exchanged water so that the concentration of the solid content of the molecule-responsive gel particles was 0.001%. The content was dispersed in an ultrasonic washing machine for 30 minutes. Scattering intensity was then measured with a light scattering spectrophotometer (DLS-7000 K manufactured by Otsuka Electronics Co. Ltd., liquid temperature 25° C., a 12φ cylindrical cell used). The average particle diameter was obtained by histogram analysis from a scattering intensity distribution attributable to the detected particles. The polydispersity index (p.d.) was similarly obtained by finding a series expansion, up to a second-order term, of the exponential part of the auto-correlation function obtained from scattering intensity and standardizing the second-order term coefficient by the square of the first-order term coefficient. A polydispersity index greater than 0.1 indicates polydispersity (multiple peaks or a single, but broad peak). A polydispersity index less than or equal to 0.1 indicates monodispersity (presence of a pointed peak).

Results show that the molecule-responsive gel particles synthesized as above, regardless of their compositions, had diameters of a few hundreds of nanometers (see Table 1). The results also show a trend where the diameters of the molecule-responsive gel particles increased with increasing CD content. This is presumably because the gel swelled and its particle diameter increased with the increasing acryloyl-CD content which had greater hydrophilicity than DEAEMA. Table also shows that the gel particles, regardless of their compositions, had polydispersity indices (p.d.) of less than 0.1. These index values indicate that relatively uniform gel particles with narrow particle diameter distributions were synthesized. In this example, the CD content (in mol %) is the proportion of the quantity of acryloyl-CD used to the sum of the monomer (acryloyl-CD, 2-(N,N-diethylamino) ethyl methacrylate (DEAEMA), and polyethylene glycol dimethacrylate (PEGDMA)).

Example 2

Measurement of Swelling of Molecule-Responsive Gel Particles

The reaction solution containing the obtained molecule-responsive gel particles were removed from the glass tube and dialyzed to remove unreacted monomer and other components.

Next, the relationship between the average diameter and the CD content of the molecule-responsive gel particles in an aqueous solution of bisphenol A (BPA) was examined.

FIG. 2 shows results. In FIG. 2, the vertical axis indicates the average diameter (in nanometers) of the molecule-responsive gel particles, and the horizontal axis indicates the CD content (in mol %). The black dots indicate measurements in an aqueous solution of bisphenol A (BPA).

FIG. 3 shows the relationship between relative change in the average diameter and the CD content of the molecule-responsive gel particles in an aqueous solution of bisphenol A (BPA). In FIG. 3, the vertical axis indicates the relative change ($d/d_0$) in the average diameter of the molecule-responsive gel particles, and the horizontal axis indicates the CD content (in mol %). Here, $d_0$ is the average diameter in nanometers of the molecule-responsive gel particles in water, and d is the average diameter in nanometers of the molecule-responsive gel particles in an aqueous solution of bisphenol A (BPA) or in comparative example 1 (detailed later), 2-phenyl ethyl acetate (PEA). The black dots in FIG. 3 indicate measurements in an aqueous solution of bisphenol A (BPA).

Results of the present example and comparative example 1 (detailed later) given in FIGS. 2 and 3 show that the diameter of the molecule-responsive gel particles containing no CD did not exhibit much change whether they were in water or in the BPA aqueous solution, whilst the average diameter of the CD-introduced molecule-responsive gel particles was smaller in the BPA aqueous solution than in water.

The decrease is presumably because the CD in the polymer chain constituting the CD-introduced molecule-responsive gel particles recognized the two aromatic rings of BPA, forming a crosslinked structure of a CD-BPA-CD complex and shrinking the swell layer (see the top of FIG. 4).

Meanwhile, the diameter of the CD-introduced molecule-responsive gel particles did not exhibit much change whether they were in the PEA aqueous solution or in water. PEA was probably recognized by the CD in the CD-introduced molecule-responsive gel particles, forming a CD-PEA complex. The PEA, however, had one aromatic ring and is unable to form crosslinked structure. As a result, the particles did not shrink (see the bottom of FIG. 4).

These results establish that the CD-introduced molecule-responsive gel particles distinguish BPA from PEA, specifically recognizing only BPA and decreasing their particle size.

Comparative Example 1

Measurement of Swell Ratio of Molecule-Responsive Gel Particles

The relationship between the average diameter and the CD content of the molecule-responsive gel particles in an aqueous solution of 2-phenyl ethyl acetate (PEA) and in water was examined.

FIG. 2 shows results. In FIG. 2, the white circles indicate measurements in water, and the black squares indicate measurements in an aqueous solution of 2-phenyl ethyl acetate (PEA).

FIG. 3 shows the relationship between relative change in the average diameter and the CD content of the molecule-responsive gel particles in an aqueous solution of 2-phenyl ethyl acetate (PEA). In FIG. 3, the black squares indicate measurements in an aqueous solution of 2-phenyl ethyl acetate (PEA).

Industrial Applicability

The molecule-responsive gel particles in accordance with the present invention, as described in the foregoing, each contain a plurality of clathrate compound-forming host molecules fixed in a crosslinked structure of a polymer gel particle. Two or more of the host molecules clathrate different atomic groups in a target molecule so that the two or more host molecules and the target molecule form a new crosslink in the molecule-responsive gel particle, which changes the volume of the molecule-responsive gel particle. These molecule-responsive gel particles which respond to specific molecules can find wide range of applications, for example, as sensor elements or adsorption materials in the environment field. The invention also enables the synthesis of molecule-responsive gel particles which respond to a biomolecule serving as a signal in relation to a disease by changing their particle size. The particles can be used as medical materials for DDSs and diagnosis sensors. The invention can therefore be applicable and very useful in the environment examination, clinical test, pharmaceutical, industrial chemical production, and various other chemical industries, as well as medical industries.

The invention claimed is:

1. A molecule-responsive gel particle changing in volume in response to a target molecule, comprising:
   a polymer gel particle; and
   a plurality of clathrate compound-forming host molecules fixed to the polymer gel particle by chemical bond,
   the polymer gel particle being obtained by emulsion polymerization of a monomer having a single polymerizable C=C double bond and a crosslinking monomer having two or more polymerizable C=C double bonds and an alkylene glycol chain of general formula (1)

   $$-(RO)_n- \qquad (1)$$

where R is ethylene, propylene, or tetramethylene and may or may not vary from one RO repeat unit to another, and n is an integer from 3 to 13,
   the plurality of host molecules being at least one or more types of molecules selected from the group consisting of cyclodextrin, crown compounds, cyclophane, azacyclophane, calixarene, and derivatives thereof.

2. The molecule-responsive gel particle as set forth in claim 1, wherein two or more of the plurality of host molecules clathrate different atomic groups in the target molecule so that the two or more host molecules and the target molecule form a crosslink in the molecule-responsive gel particle.

3. The molecule-responsive gel particle as set forth in claim 1, wherein the molecule-responsive gel particle changes in volume in the presence of target molecules each containing two or more atomic groups which can be clathrated by the plurality of host molecules.

4. The molecule-responsive gel particle as set forth in claim 1, wherein the molecule-responsive gel particle changes in volume in the presence of target molecules each containing two or more types of atomic groups which can be clathrated by the plurality of host molecules which is a combination of two or more different types of host molecules.

5. The molecule-responsive gel particle as set forth in claim 1, wherein the molecule-responsive gel particle is a hydrogel.

6. The molecule-responsive gel particle as set forth in claim 1, wherein letting a net amount of the monomer having a single polymerizable C=C double bond and the crosslinking monomer be 100 mol %, the crosslinking monomer is used within a range of 0.1 to 50 mol %.

7. The molecule-responsive gel particle as set forth in claim 1, wherein the monomer having a single polymerizable C=C double bond is a (meth)acrylate monomer, a vinyl ether monomer, vinyl acetate, or styrene.

8. The molecule-responsive gel particle as set forth in claim 1, wherein the crosslinking monomer is polyalkylene glycol di(meth)acrylate or polyalkylene glycol divinyl ether.

9. The molecule-responsive gel particle as set forth in claim 1, wherein the plurality of host molecules is used in 0.1 to 40 mol % with respect to a net amount of the plurality of host molecules and all the feedstock monomers.

10. The molecule-responsive gel particle as set forth in claim 1, wherein the molecule-responsive gel particle has an average diameter of 10 nm to 50 μm.

11. A dry product obtained by drying the molecule-responsive gel particles as set forth in claim 1.

12. A method of producing molecule-responsive gel particles of claim 1, comprising:
   the reactive-functional-group-introducing step of introducing reactive functional groups to at least one type of host molecules selected from the group consisting of cyclodextrin, crown compounds, cyclophane, calixarene, and derivatives thereof; and
   the polymerization step of emulsion polymerizing a polymer-gel-fine-particle forming monomer having a single polymerizable C=C double bond in the presence of a crosslinking monomer and the reactive-functional-group-introduced host molecules obtained in the reactive-functional-group-introducing step so as to obtain molecule-responsive gel particles,
   the crosslinking monomer having two or more polymerizable C=C double bonds and an alkylene glycol chain of general formula (1)

   $$-(RO)_n- \qquad (1)$$

where R is ethylene, propylene, or tetramethylene and may or may not vary from one RO repeat unit to another, and n is an integer from 3 to 13.

13. The method as set forth in claim 12, wherein letting a net amount of the monomer having a single polymerizable C=C double bond and the crosslinking monomer be 100 mol %, the crosslinking monomer is used within a range of 0.1 to 50 mol %.

14. The method as set forth in claim 12, wherein the host molecules account for 0.1 to 40 mol % of a net amount of the host molecules and all the feedstock monomers.

15. A method of detecting a target molecule, comprising the steps of:
   causing a specimen to contact the molecule-responsive gel particles as set forth in claim 1; and
   determining whether or not the specimen contains a target molecule by means of a change in volume of the molecule-responsive gel particles.

16. A target molecule detection kit, comprising the molecule-responsive gel particles as set forth in claim 1.

17. A target-molecule-adsorption/removal material, comprising the molecule-responsive gel particles as set forth in claim 1.

18. The molecule-responsive gel particle as set forth in claim 1, wherein the plurality of host molecules are fixed to the polymer gel particle in a manner such that reactive functional groups introduced into the plurality of host molecules are incorporated into a polymer compound forming the polymer gel particle through emulsion polymerization.

19. The molecule-responsive gel particle as set forth in claim 1, wherein the plurality of host molecules are fixed to the polymer gel particle in a manner such that reactive functional groups introduced into the plurality of host molecules react with a polymer compound forming the polymer gel particle.

* * * * *

UNITED STATES PATENT AND TRADEMARK OFFICE
CERTIFICATE OF CORRECTION

PATENT NO. : 8,586,372 B2  Page 1 of 1
APPLICATION NO. : 12/598904
DATED : November 19, 2013
INVENTOR(S) : Miyata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this
Twenty-second Day of September, 2015

Michelle K. Lee
*Director of the United States Patent and Trademark Office*